W. J. CLARK & T. W. ROBERTS.
Fish-Trap.

No. 204,538.  Patented June 4, 1878.

WITNESSES:
Henry N. Miller
C. Sedgwick

INVENTOR:
T. W. Roberts
W. J. Clark
BY
ATTORNEYS.

UNITED STATES PATENT OFFICE.

WILLIAM J. CLARK AND THOMAS W. ROBERTS, OF COFFEEVILLE, MISS.

IMPROVEMENT IN FISH-TRAPS.

Specification forming part of Letters Patent No. 204,538, dated June 4, 1878; application filed March 1, 1878.

*To all whom it may concern:*

Figure 1:
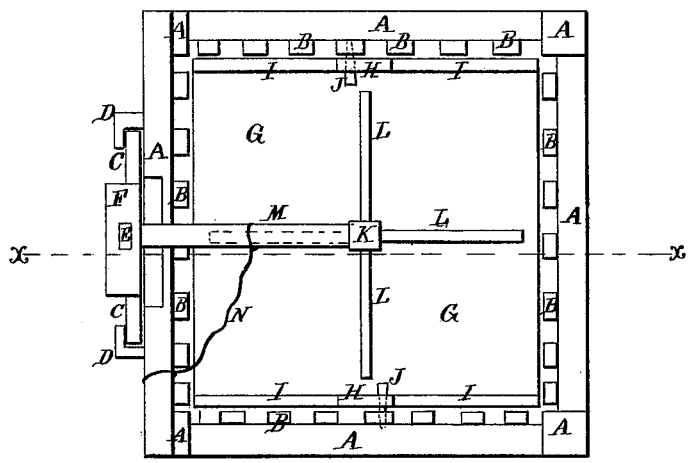
Figure 2:
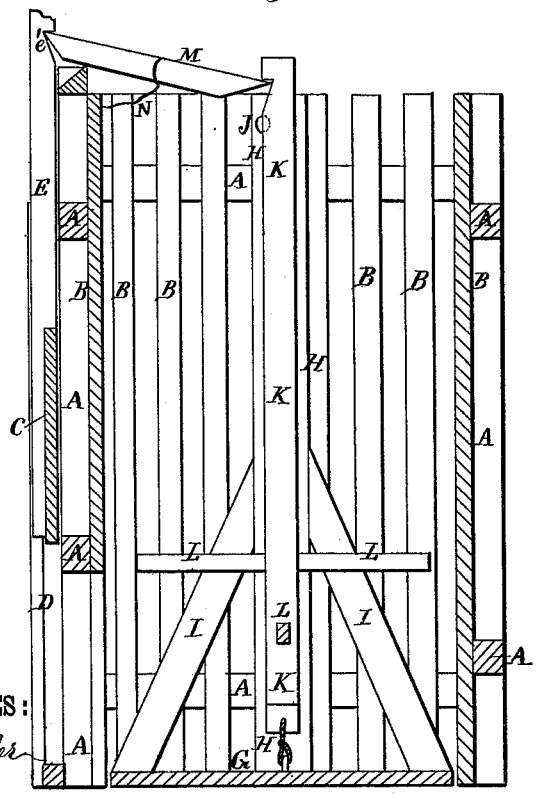

Be it known that we, WILLIAM JESSEE CLARK and THOMAS WILLIAM ROBERTS, of Coffeeville, in the county Yalabusha and State of Mississippi, have invented a new and useful Improvement in Fish-Traps, of which the following is a specification:

Figure 1 is a top view of our improved fish-trap. Fig. 2 is a vertical section of the same, taken through the line $x\ x$, Fig. 1.

Similar letters of reference indicate corresponding parts.

The object of this invention is to furnish an improved trap for catching fish in streams, which shall be simple in construction and will allow the fish to be conveniently taken out without taking up the trap.

The invention will first be described in connection with the drawing, and then pointed out in the claim.

A is the frame of the trap, which is made of convenient size, and is permanently secured at the bottom of the stream. The sides of the trap are formed of slats B, attached to the frame A at such a distance apart as will prevent the fish from passing through, while allowing the water to flow through freely.

In the lower part of one side of the trap is formed an opening, which is closed by a door, C. The door C slides in guides D, attached to the side of the trap, and to it is attached a bar, E, the upper end of which rises above the top of the trap A B, and has a weight, F, attached to its upper end.

The weight F is made heavy enough to force the door C, when released, down quickly and close the opening.

In the inner side of the bar E is formed a notch, $e'$, in such a position as to be just above the top side bar of the frame A when the door C is raised above the opening.

G is the bottom of the trap, which is made of such a size as to move up and down freely within the said trap.

To the side edges of the bottom G are attached the lower ends of two bars, H, which are made of such a length as to extend to or above the top of the trap A B, to serve as handles in raising and lowering the said bottom G, and which are strengthened by braces I, the upper ends of which are attached to the said bars H, and their lower ends are attached to the corners of the said bottom G. The bottom G is fastened in place, when lowered, by the pins J, which pass through the bars H and through the bars of the trap A B.

To the center of the bottom G is swiveled, by a cord or by other suitable means, the lower end of a bar, K, which has two or more cross-bars, L, attached to its lower part.

In one side of the upper part of the bar K is formed a notch, $k'$, in such a position as to receive one end of the trigger M when it rests upon the top bar of the frame A, and its other end is in the notch $e'$ of the bar E. The upper side of the side bar of the frame A, upon which the trigger M rests, is beveled to an edge to make the said trigger more sensitive.

The trigger M is secured to the trap A B by a cord, N, to prevent it from being carried off by the water when the said trap is sprung.

In using the trap the bottom is lowered and secured in place, the bait is put in, and the door is raised and secured by the trigger M. As the fish enter they strike against the cross-bars L, which turns the bar K and springs the trap, allowing the door C to fall. The pins J are then taken out, the bottom G is raised, and the fish taken out. The bottom G is then lowered and the trap is again set.

Having thus described our invention, we claim as new and desire to secure by Letters Patent—

The slat-frame trap A B, having a slide-door provided with notched and weighted bar E, connected by trigger M with a bait-bar, K, swiveled to the movable bottom, as and for the purpose described.

WILLIAM JESSEE CLARK.
THOMAS WILLIAM ROBERTS.

Witnesses:
M. H. HARBOUR,
W. C. WINTER.